(12) United States Patent
Jalaleddine

(10) Patent No.: US 6,236,582 B1
(45) Date of Patent: May 22, 2001

(54) LOAD SHARE CONTROLLER FOR BALANCING CURRENT BETWEEN MULTIPLE SUPPLY MODULES

(75) Inventor: Sateh M. Jalaleddine, San Jose, CA (US)

(73) Assignee: Micro Linear Corporation, San Jose, CA (US)

(*) Notice: Subject to any disclaimer, the term of this patent is extended or adjusted under 35 U.S.C. 154(b) by 0 days.

(21) Appl. No.: 09/495,826

(22) Filed: Feb. 1, 2000

(51) Int. Cl.[7] ........................................ H02M 7/00
(52) U.S. Cl. .................................. 363/72; 363/147
(58) Field of Search .............................. 363/72, 147

(56) References Cited

U.S. PATENT DOCUMENTS 5,428,523 * 6/1995 McDonnal ........................... 307/58
5,757,634 * 5/1998 Ferens ................................... 363/72

* cited by examiner

Primary Examiner—Shawn Riley
(74) Attorney, Agent, or Firm—Haverstock & Owens LLP

(57) ABSTRACT

An current share controller detects a power converter module having the lowest supply current. That lowest supply current converter module is selected to be the system master. The current share controller is configured such that shared devices within the system can hot-swap capability. An output voltage loop amplifier includes an opto-coupler driver. The voltage loop amplifier compensation is compatible with conventional TL431 shunt regulators. This allows a power supply system to balance supply current between multiple supply modules with an eight pin load balancer configuration.

3 Claims, 9 Drawing Sheets

Fig. 2

*Fig. 3* Vref Adjust Block

LOAD SHARE CONTROLLER FOR BALANCING CURRENT BETWEEN MULTIPLE SUPPLY MODULES

FIELD OF THE INVENTION

This invention relates to the field of controllers for power supply devices. More particularly, this invention relates to controllers having a low pin count for sharing a load among more than one power supply.

BACKGROUND OF THE INVENTION

It is known that more than one power supply can be used to provide power to a common power bus. Care must be taken to avoid having one circuit attempt to provide all the power. Such a condition could cause that circuit to fail. For example, FIG. 1 shows circuit for a Unitrode UC1907, UC2907 and UC3907 integrated circuit. The Unitrode approach allows multiple power supply modules to be coupled together in parallel. Each of the parallel power supply module only supplies a proportionate share of the total load current. A current from each power supply module is sensed. The controller determines which of the power supply modules would normally have the highest current value and designates it as the master. The power supply module with the highest current is the one that is most likely to fail first. Upon determination of the master module, the other modules are adjusted have provide current within 2.5% of the current value of the master.

This Unitrode approach requires a sixteen pin package to provide sufficient inputs and outputs to control the power supply modules. It is well known that the cost of an integrated circuit is proportional in some measure to the number of these so-called I/O pins. As such it is desirable to reduce the number of pins.

SUMMARY OF THE INVENTION

The present invention is for an eight pin load current share controller. Unlike the prior art, the load share controller of the present invention detects the power supply module having the lowest supply current. That lowest supply current power supply module is selected to be the system master. Because it has the lowest supply current from among other similar power supply modules, the system reliability is enhanced.

In addition, because of the architecture of the load share controller, the devices in the system can be hot-swap capability. An output voltage loop amplifier includes an opto-coupler driver. The voltage loop amplifier compensation is compatible with conventional TL431 shunt regulators. This allows a power supply system to be implemented according the advantages of the present invention with minimum effort.

BRIEF DESCRIPTION OF THE DRAWINGS

FIG. 1 shows a block diagram of a prior art load share controller.

DETAILED DESCRIPTION OF THE PREFERRED EMBODIMENT

Designers of certain classes of power system desire systems of high reliability, fault tolerance and performance over a broad range of power. Such systems require balancing among power supply modules. Without proper balancing, one power supply module can drive most of the current possibly causing it to fail sooner than the other power supply modules. Upon failure, additional stress is applied to the remaining power supply modules which are increasingly more likely to fail.

Figure 2:
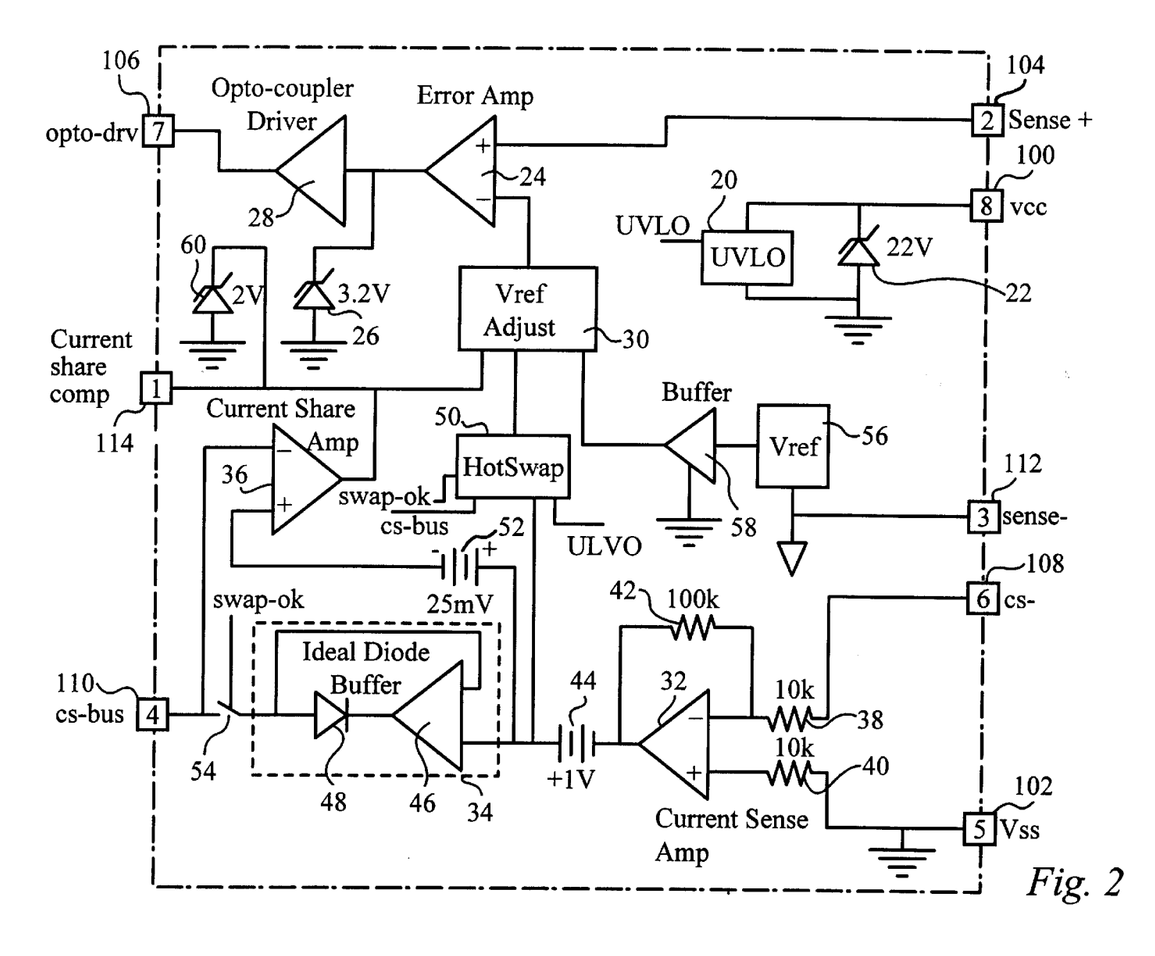
FIG. 2 shows a block diagram of the load current share controller of the present invention.

FIG. 2 shows a block diagram of the preferred embodiment of the present invention. The present invention is implemented as an integrated circuit. A power supply pin Vcc 100 is coupled to a first terminal of a UVLO under voltage lock out circuit 20 and to the n-terminal of a zener limit shunt 22. The other terminal of the UVLO 20 and the p-terminal of the zener shunt 22 are coupled to the ground pin 102 of the circuit.

The circuit comprises to main loops; an output voltage loop and a current share loop. The output voltage loop principally includes an error amplifier 24 and an opto-coupler driver 28. The positive input of the error amplifier 24 is coupled to a sense+input 104. The output of the error amplifier 24 is coupled to a n-terminal of a zener diode 26 and the input of an opto-coupler driver 28. The p-terminal of the zener diode 26 is coupled to the circuit ground 102. The output of the opto-coupler driver 28 is coupled to an opto-drv pin 106 for driving an external optical interface circuit. The negative input of the error amplifier is coupled to receive a Vref adjust signal from a Vref adjust circuit 30. A sense-pin 112 is coupled to Vref circuit 56, preferably a band gap block. In the preferred embodiment the Vref voltage is 1.22v. The output of the Vref circuit 56 is passed to the Vref adjust circuit 30 through a buffer circuit 58. The output voltage loop regulates the output voltage of the system.

The current share loop principally includes a current sense amplifier 32, an ideal diode buffer 34, a current share amplifier 36 and the Vref adjust circuit 30. The current share loop senses the current of the power supply module to which it is directly coupled across an external sense resistor (not shown) coupled between a CS-pin 108 and the Vcc pin 100. The CS-pin 108 is coupled to the negative input of the current sense amplifier 32 through a biasing resistor 38. The positive input of the current sense amplifier 32 is coupled to the ground pin through a biasing resistor 40. Preferably, the biasing resistors 38 and 40 are of the same value. A biasing resistor 42 is coupled between the negative input and the output of the current sense amplifier 32. Preferably, the biasing resistor 42 has ten times the impedance of the biasing resistors 38 and 40. A first terminal of a first offset adjust voltage 44 is coupled to the output of the sense amplifier 32 to increase its output level.

The ideal diode buffer 34 includes an amplifier 46 and a diode 48. A second terminal of the first offset adjust voltage 44 is coupled to the positive input of the amplifier 46. An n-terminal of the diode 48 is coupled to the output of the amplifier 46. A p-terminal of the diode 48 is coupled to the negative input of the amplifier 46.

The second terminal of the offset adjust voltage 44 is coupled to a hot swap circuit 50 and also to a first terminal of a second offset adjust voltage 52 to decrease the voltage of the first offset adjust voltage 44. The second terminal of the offset adjust voltage 52 is coupled to a positive input of the current share amplifier 36. The negative terminal of the current share amplifier 36 is coupled to a CS-BUS pin 110. The CS-BUS pin 110 is also coupled to the p-terminal of the diode 48 through a switch 54 and as an input to the hot swap circuit 50. The hot swap circuit 50 controls the state of the switch 54 in the case of a fault condition as described below. A current share pin 114 is coupled to the output of the current share amplifier 36 and to the n-terminal of a zener diode 60. A p-terminal of the zener diode 60 is coupled to the ground pin 102.

If the converter has the lowest current it is set to be the master converter. The CS-BUS pin 110 is similarly connect to each of the slave power supply modules (not shown) which are not configure to drive their respective pins. When configured as a master, the positive input of the current share amplifier will be lower than the voltage at its negative input by the value of the second offset adjust voltage 52. This causes the output of the current share amplifier to be low which disables the Vref voltage adjust circuit 30. The loop voltage will be that generated by the Vref circuit 56.

On the other hand, if the converter does not have the lowest current it is configured as a slave. The output voltage of the current sense amplifier will not be higher than the CS-BUS pin 112. The ideal diode buffer 34 will thus be unable to drive the CS-BUS pin 110 since the diode 48 will be reverse biased. The CS-BUS will be driven by another converter that has a lower current. When that occurs, the negative input of the current share amplifier 36 will be lower than its positive input. In this case, the output of the current share amplifier 36 will be high. As will be seen in the discussion of the circuit of FIG. 3, when the output of the current share amplifier 36 is high, the Vref voltage will be pulled lower by the Vref adjust circuit 30. As Vref decreases, the voltage in the voltage loop decreases so that the optocoupler current sink increases. This causes the output current of the converter to decrease until it is close to that of the current in the master converter.

Figure 3:
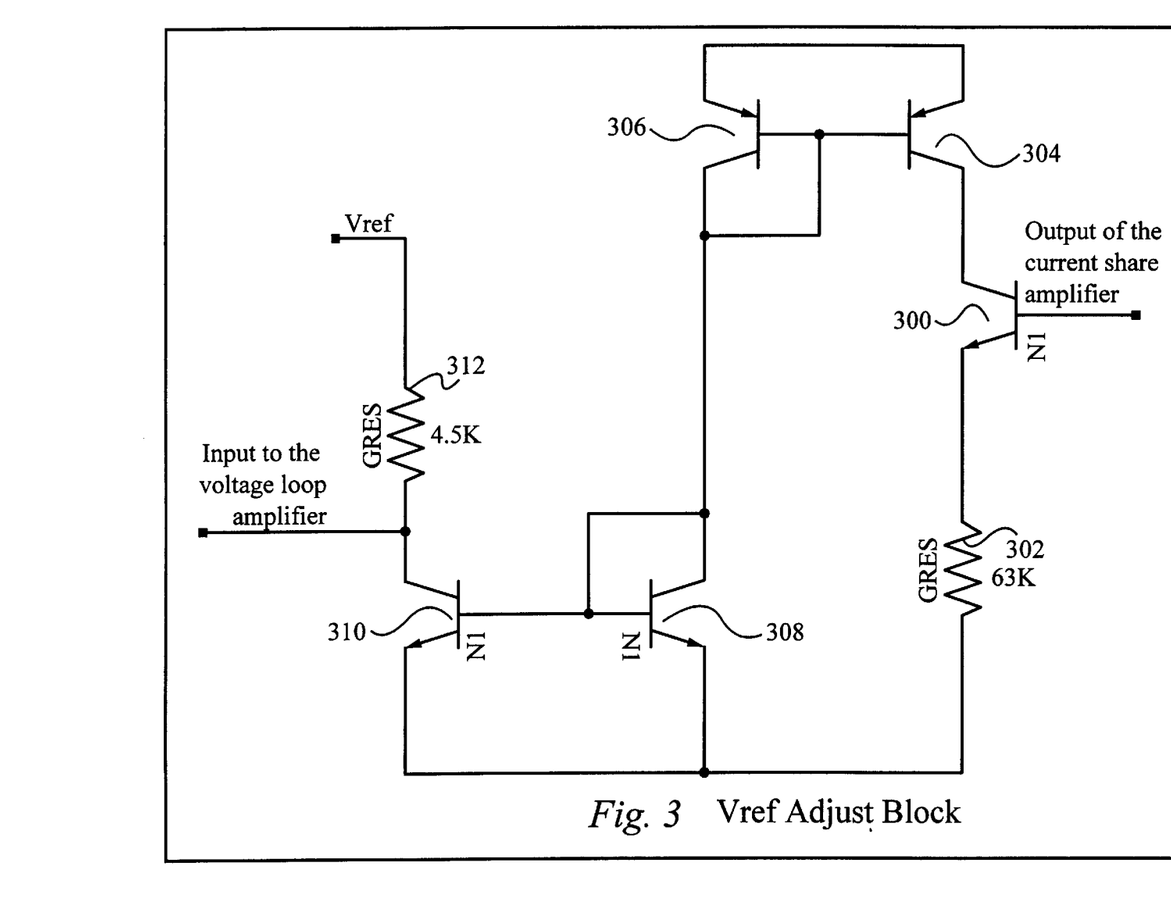
FIG. 3 shows a schematic diagram of the Vref adjust block contained in the block diagram of FIG. 2.

FIG. 3 shows a schematic diagram of the Vref adjust block 30 of FIG. 2. A first npn transistor 300 having a collector, a emitter and a base is coupled to receive the output of the current share amplifier 36 (FIG. 2) at its base. The emitter of the first npn transistor 300 is coupled to ground through a resistor 302. The collector of the first npn transistor 300 is coupled to a collector of a first pnp transistor 304 also having a base and an emitter. The emitter of the first pnp transistor is coupled to the Vcc pin 100 (FIG. 2). The base of the first pnp transistor is coupled to the collector and the base of a second pnp transistor 306. The emitter of the second pnp transistor is coupled to the Vcc pin 100. The first and second pnp transistors 304 and 306 are coupled as a current mirror.

The collector and base of the second pnp transistor 306 and the base of the first pnp transistor 304 are all coupled the the base and collector of a second npn transistor 308 and to the base of a third npn transistor 310. The emitters of the second and third npn transistors 308 and 310 are coupled to the ground pin 102. The collector of the third npn transistor 310 is coupled to the negative input of the error amplifier 24 (FIG. 2) and also to receive the output of the Vref circuit 56 (FIG. 2) via the buffer 58 (FIG. 2) through a resistor 312. The second and third npn transistors 308 and 310 are configured as a current mirror.

When the output of the current share amplifier 36 is high, the first npn transistor 300 will be on and conduct current. This current is mirrored in the current mirror formed of the first and second pnp transistors 304 and 306 and then through the current mirror formed of the second and third npn transistors 308 and 310. The current will draw the collector of the npn transistor 310 down and lower the input to the error amplifier 24 (FIG. 2). When the output of the current share amplifier 36 is low, the first npn transistor 300 will be cut-off and not conduct current. This condition will be mirrored through the two current mirrors such that no current flows through the third npn transistor 310. This causes the input to the error amplifier to rise to the voltage Vref.

Figure 4:
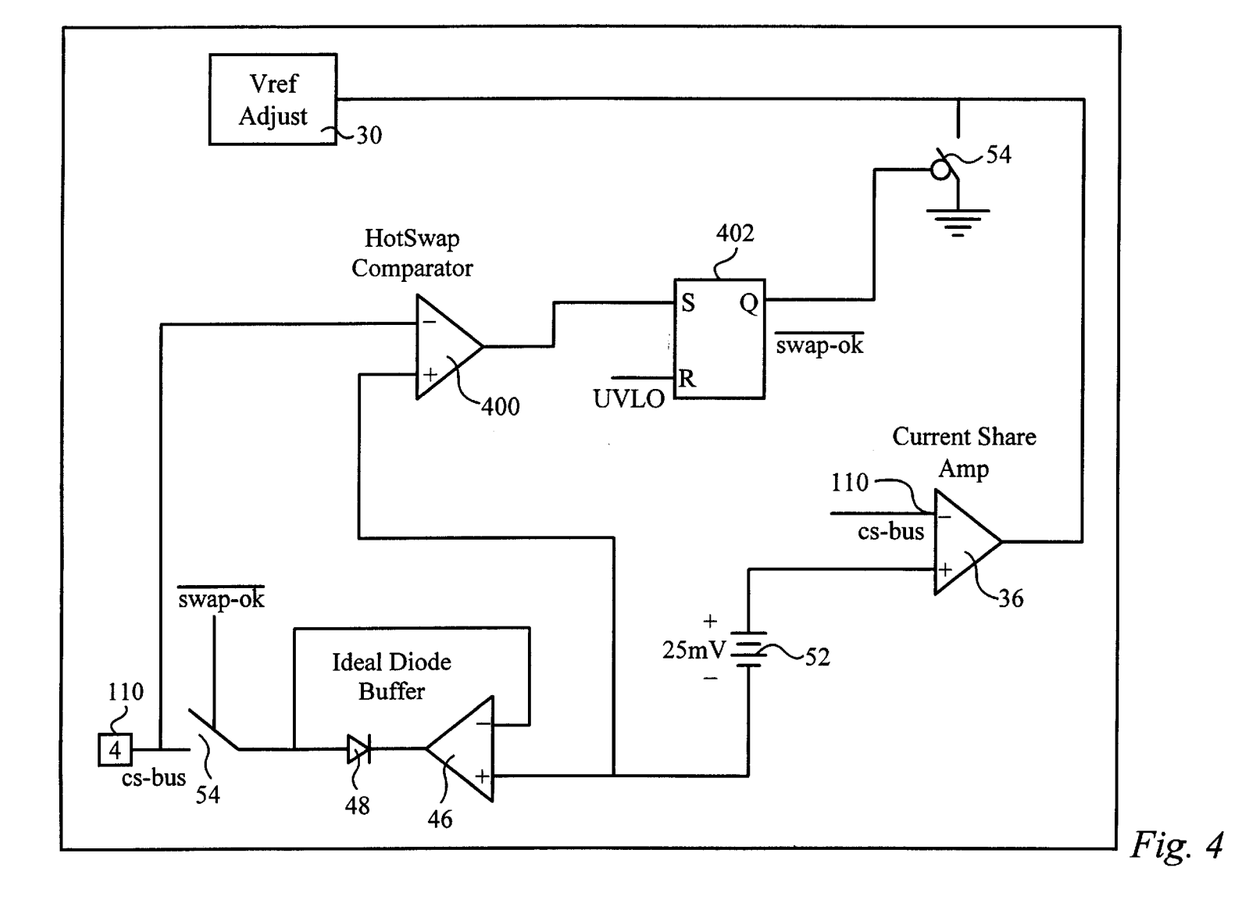
FIG. 4 shows a block diagram of the hot swap circuit contained in the block diagram of FIG. 2.

FIG. 4 shows the operation of the hot swap function in the diagram of FIG. 2. Those elements that are identical to those of FIG. 2 are drawn with the same reference numerals to avoid confusion. A hot swap comparator 400 is coupled to receive on its negative input the voltage driven onto the CS-BUS 110 by the master converter. The positive input of the hot swap comparator 400 is coupled to receive the input to the positive input of the amplifier 46. The output of the hot swap comparator is coupled to the set input of an SR flip flop 402. The reset input of the SR flip flop 402 is coupled to the output of the UVLO circuit 20 (FIG. 2). The output of the SR flip flop 402 drives the switch 54 to isolate faulty converter.

Because of the hot swap function, insertion or removal of converters does not affect the operation of the system; the powered bus voltage remains the same. Likewise, the removal of a converter does not affect the bus voltage in the master-slave scheme. If the removed converter was the master, one of the remaining converters having the lowest current will automatically be configures as the master. If the converter was a slave, the remaining converters will share the task of supplying the extra load current. In the case of a fault condition, the UVLO will be asserted and the CS-BUS of the faulty converter will be isolated from the system share bus as shown in FIG. 4.

If a converter is inserted into operation, it can momentarily reduce the power supplied. If the inserted converter is operating at a much lower level than the bus, it will assume the role of master and pull the other converters down. The hot swap circuit of FIG. 4 isolates such a converter until it cannot pull down the system.

Figure 5A:
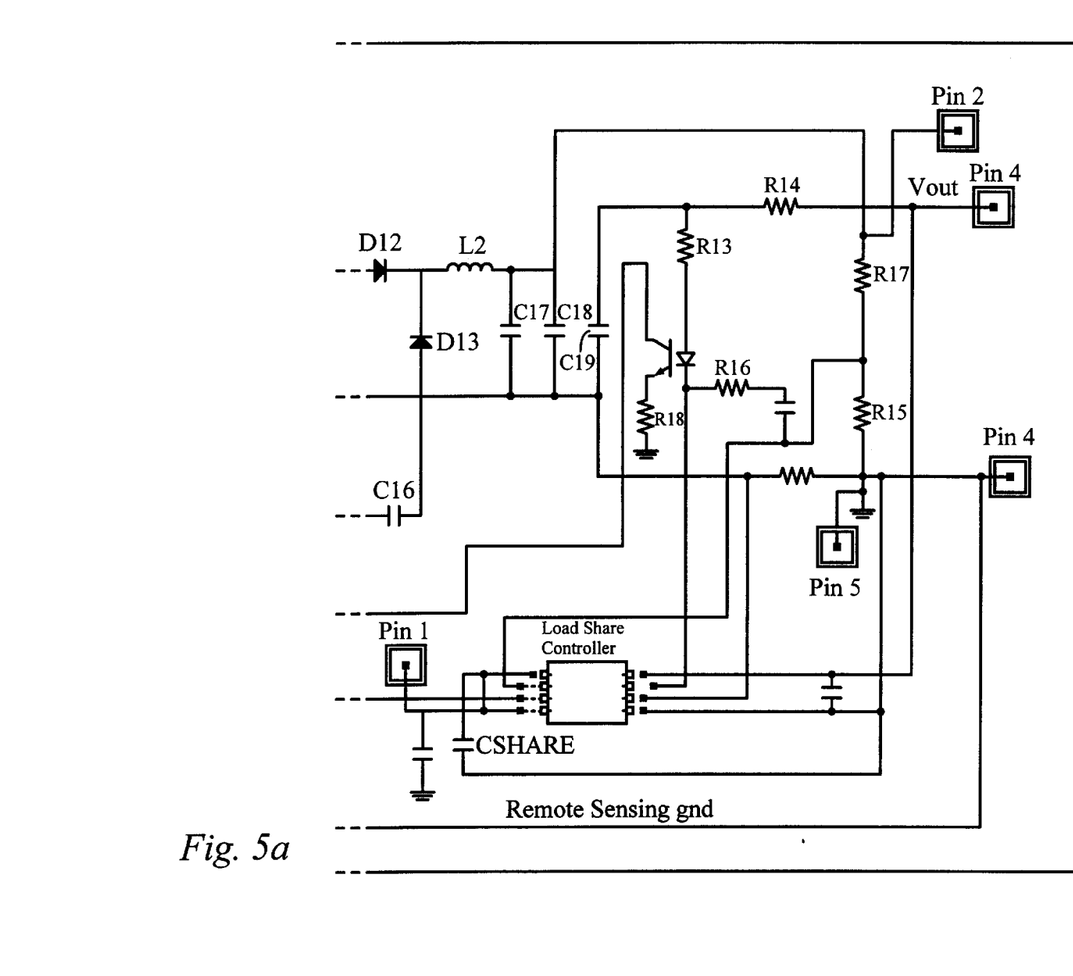
FIG. 5 shows a detailed circuit schematic of one implementation of the circuit of the present invention used to couple two units in parallel.
Figure 5B:
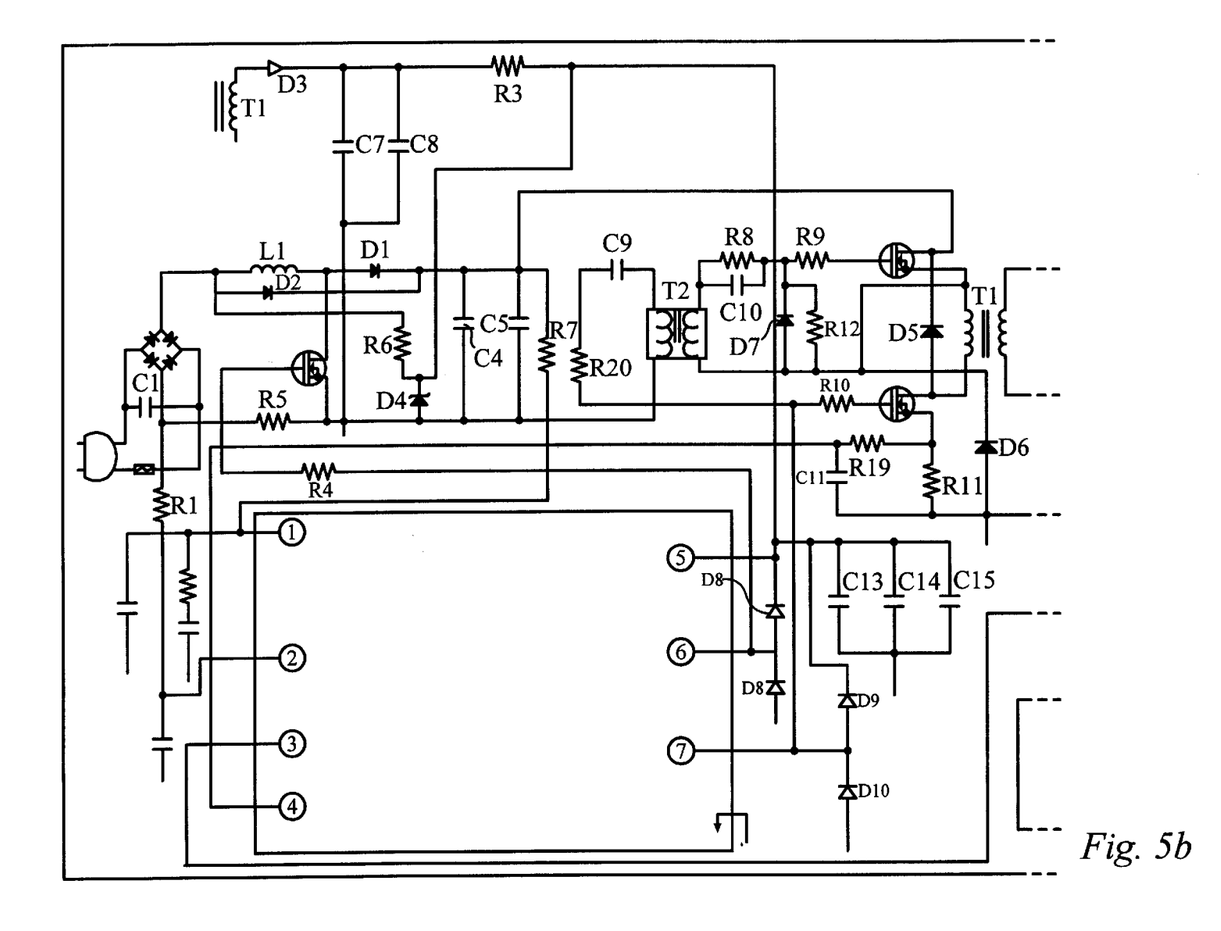
Figure 5C:
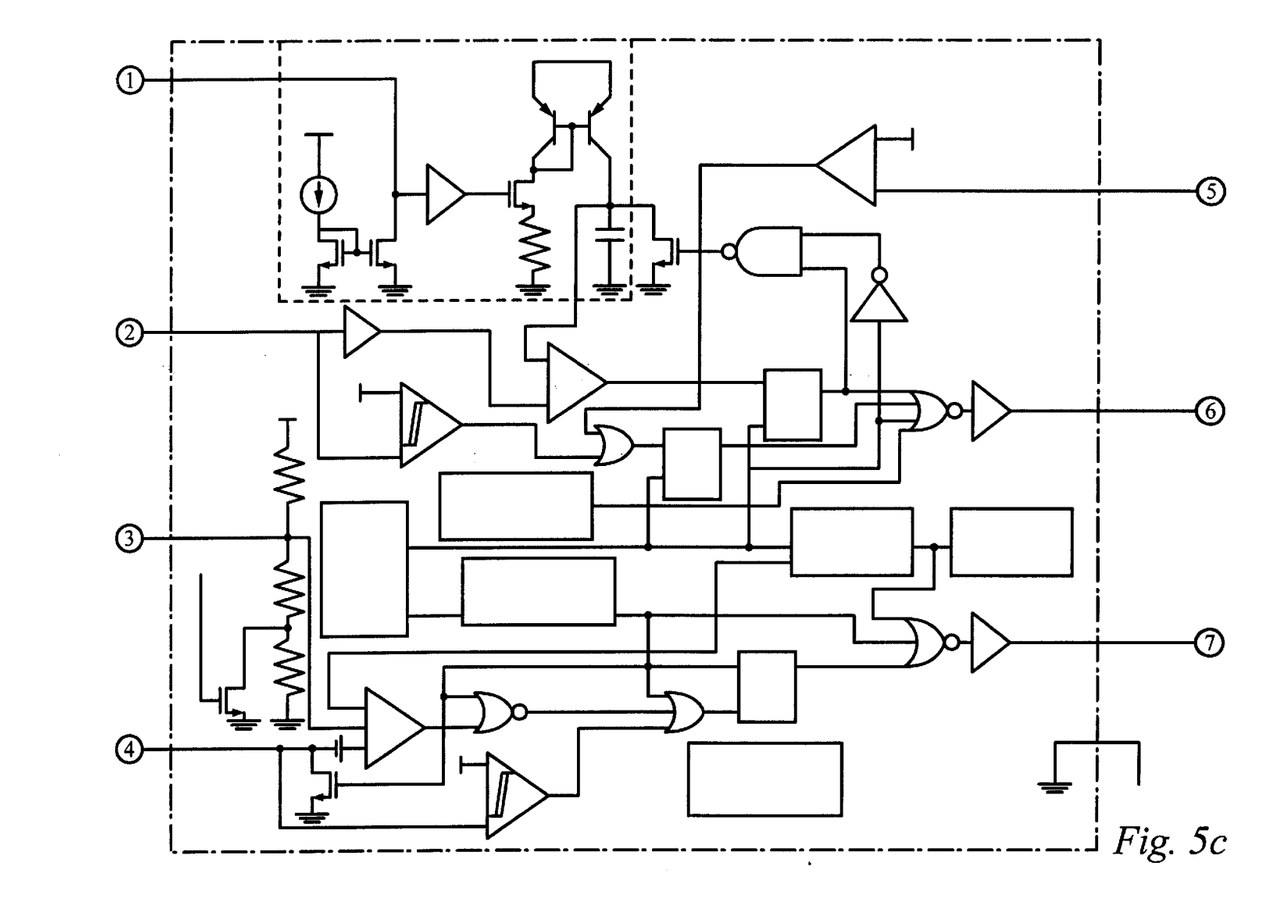

FIG. 5 shows a detailed circuit schematic of one implementation of the circuit of the present invention used to couple two units in parallel. The circuit is for a PFC/PWM controller and the load share controller connected at the secondary side of the power supply. The prototype is a 200W power supply with a 12v-output range.

Figure 6:
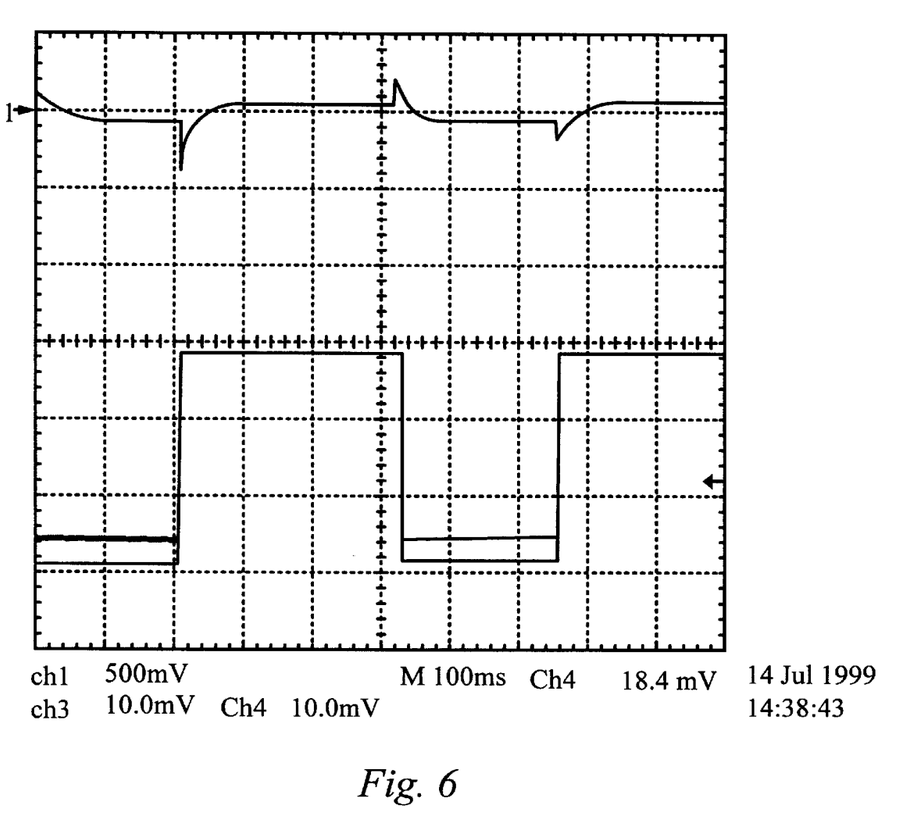
FIGS. 6 and 7 shows experimental results for two units coupled in parallel according to the implementation of FIG. 5.
Figure 7:
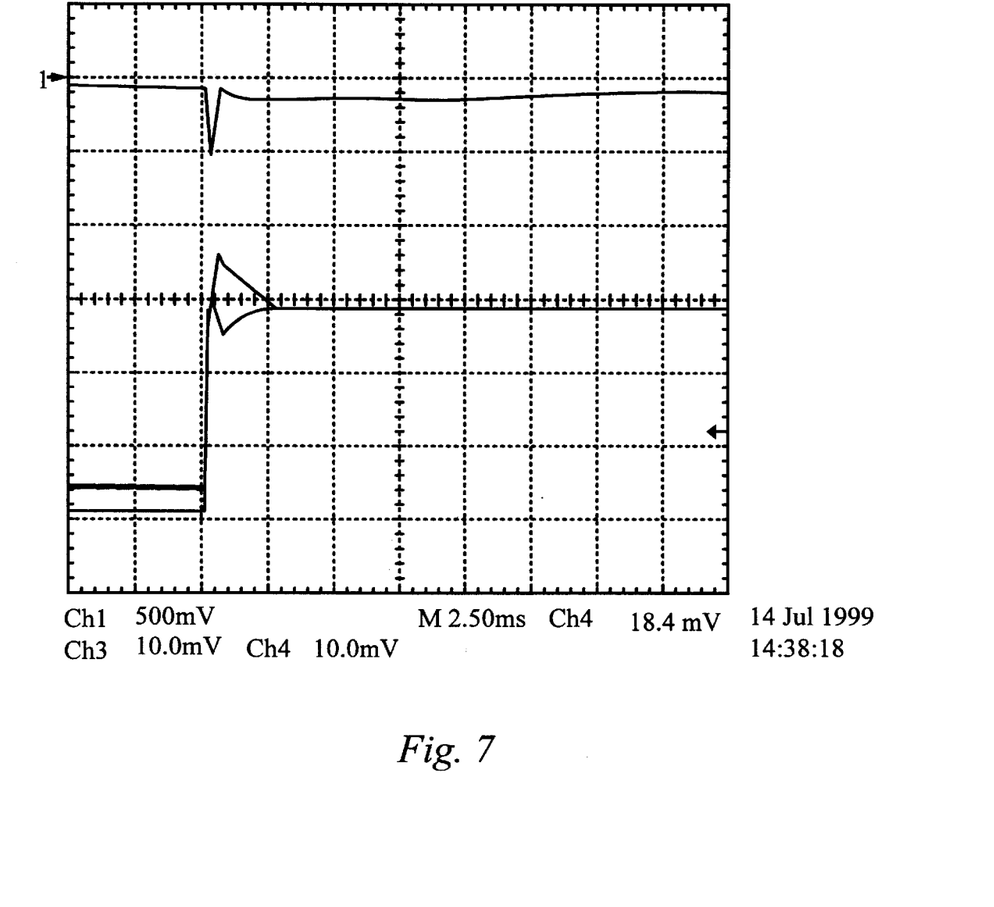

FIGS. 6 and 7 shows experimental results for two units coupled in parallel according to the implementation of FIG. 5.

What is claimed is:

1. A load share controller for sharing a load among a plurality of converters comprising:

a. means for sensing which of the converters is supplying the lowest current; and b. means for setting the converter with the lowest current as a master converter.

2. The load share controller according to claim 1 further comprising means for adjusting a reference level for a slave converter.

3. The load share controller according to claim 1 further comprising means for preventing a converter from coupling to supply the load unless it is operating within a predetermined range of values.

* * * * *